Patented July 15, 1930

1,770,811

UNITED STATES PATENT OFFICE

EMIL WILLIAM SCHWARTZ AND FREDERICK RICHARD KAIMER, OF BRIDGEPORT, CONNECTICUT, ASSIGNORS TO GENERAL ELECTRIC COMPANY, A CORPORATION OF NEW YORK

ELECTRODE FOR ARC WELDING AND PROCESS OF MAKING THE SAME

No Drawing.  Application filed January 15, 1927.  Serial No. 161,464.

Our invention relates to electrodes for welding by the metallic arc method, and the process of making such electrodes.

In metallic arc welding, an arc is maintained between a metal pencil, usually in the form of a rod, wire or strip, called the welding electrode, and the work, which constitutes the other electrode. During welding, the welding pencil or electrode is fused or vaporized, or both, and the metal thereof is deposited upon and welded to the work. During welding, the electrode is fed toward the work, either manually or automatically, so as to maintain the arc length substantially constant.

It has been found that the facility with which an arc may be maintained, and satisfactory metal deposited, is affected by certain elements or compounds applied to the welding electrode, for example, as a coating. Electrodes so coated are commonly designated as flux-coated electrodes, and coatings heretofore proposed vary from comparatively thick coatings to coatings of inappreciable thickness, including in some cases mere traces of elements or compounds to produce desired effects. Many of the coatings heretofore proposed, both of the relatively thick and relatively thin types, have a fairly high insulating value, in effect, like an insulating enamel, which prevents the use of the electrode in an automatic arc welding machine of the type where the welding current is led into the moving electrode through electrode feed rolls or equivalent devices, such as brushes and the like. Where such electrodes are used for manual arc welding, the coating must be removed in order to make a good electrical contact between the electrode and the electrode holder which the operator holds and manipulates during welding. In many types of coated electrodes, the coating easily comes off of the electrode, making the electrode dirty to handle and producing objectionable variations in the amount of flux which may remain upon the electrode at the time it comes to be used after manufacture, shipping and handling prior to use for welding.

Objects of our invention are to produce an improved electrode having satisfactory welding characteristics, and a process of manufacturing such electrodes which shall insure uniform results, which shall be relatively inexpensive to practice and which shall produce upon the electrode a relatively thin, but appreciable and substantially homogeneous coating, not easily rubbed off of the electrode, and which shall be conducting so that the electrode may be secured at any point along its length in an electrode holder for manual arc welding, or used in an automatic arc welding machine wherein the current is led into the electrode by rolls or their equivalent as the electrode is fed during consumption.

According to a preferred embodiment of our process, the steel welding wire as it comes from the manufacturer, usually in the form of reels containing many feet, is placed in a bath composed of water, red oxide of iron, a compound of calcium and a small amount of sodium silicate. An example of a bath which we have found satisfactory is as follows:

| | Parts by weight |
|---|---|
| Water | 100 |
| Sodium silicate | 5 |
| Red oxide of iron | 30 |
| Lime | 40 |

We prefer to boil the wire in the solution for a sufficient time to produce the desired effect upon the wire, and we at present prefer to boil the wire in the solution approximately five to eight hours. The wire is then simply removed from the solution, preferably wiped to remove any excess material adhering to its surface, and then allowed to dry, after which it is in condition for use. Where the wire as received from the manufacturer is wound on reels, and the electrode is to be made up into bundles of short lengths for manual welding, the wire after drying is passed through straightening rolls and cut into short lengths.

The sodium silicate in the bath acts to form an efficient medium for the suspension of the particles of red oxide of iron and lime in the bath. All the ingredients contribute to give the bath an alkaline reaction which we find very desirable. The red oxide of iron and the lime are deposited on the surface of the wire, and cooperate to give the electrode good fluxing and arc stabilizing characteristics.

The electrode wire made according to our process has a substantially uniform and homogeneous outer layer consisting principally of red oxide of iron and lime, with only a very small amount of sodium silicate. By homogeneous in this description and in the appended claims we mean the intimate intermixture of the finely divided substances throughout the coating as distinguished from a coating made up of superposed layers. The surface of the rod or wire has a reddish brown color, and, due to the coating on the wire, it remains substantially free from corrosion after manufacture. The coating is quite adherent to the wire and can be rubbed off in a very slight amount only, so that the wire is relatively clean to handle, and may be shipped and handled without damage to its coating with substantially the same facility as bare wire.

While we have described the calcium compound as used in the form of lime, we have found that calcium carbonate may be used. One example of a bath which we have found satisfactory, utilizing both calcium oxide and calcium carbonate, comprises 100 parts of water, 5 parts of sodium silicate, 30 parts of red oxide of iron and 20 parts each of calcium oxide and calcium carbonate, and where in the appended claims we refer to a compound of calcium we intend to include either calcium oxide or calcium carbonate.

While in the foregoing description we have indicated as satisfactory certain particular proportions of the elements of our treating bath, it is to be understood that some variations may be made without departing from our invention.

It will be understood that the electrode material which is treated may be put into the bath either in the form of reels of wire or in the form of rods or strips of any desired length, and by the expression electrode wire in the appended claims we intend to include round wire or rod or other shapes of electrode strip.

What we claim as new and desire to secure by Letters Patent of the United States is:

1. The process of manufacturing a coated arc welding electrode which comprises heating electrode wire in a mixture of substantially equal parts by weight of red oxide of iron and a calcium compound suspended in about one and one-half times as much water containing a small amount of sodium silicate for a time sufficient to produce upon a wire an appreciable thin coating.

2. The method of manufacture of a coated arc welding electrode which comprises maintaining electrode wire in a bath composed of about 100 parts by weight of water, about 5 parts by weight of sodium silicate, about 30 parts by weight of red oxide of iron and about 40 parts by weight of lime, at a temperature substantially that of the boiling point of water, for a period of time sufficient to form on the electrode wire an appreciable thin homogeneous flux coating.

3. An electrode for arc welding comprising a metal wire having a substantially uniform, homogeneous, adherent flux coating containing iron oxide and calcium compound in about the ratio of 30 parts iron oxide to 40 parts of calcium compound.

4. An electrode for arc welding comprising a metal wire having a substantially uniform, homogeneous, adherent coating containing the following fluxing and arc-stabilizing agents; about 30 parts red oxide of iron to about 40 parts of calcium compound, said coating also containing an admixture of sodium silicate.

In witness whereof, we have hereunto set our hands this 14th day of January, 1927.

EMIL WILLIAM SCHWARTZ.
FREDERICK RICHARD KAIMER.